United States Patent [19]
Torgerson et al.

[11] Patent Number: 4,770,914
[45] Date of Patent: * Sep. 13, 1988

[54] TWO-SIDED ADHESIVE TAPE

[75] Inventors: Gary D. Torgerson; Joyce E. Ferm, both of Seattle, Wash.

[73] Assignee: Ferm & Torgerson, Seattle, Wash.

[*] Notice: The portion of the term of this patent subsequent to Apr. 15, 2003 has been disclaimed.

[21] Appl. No.: 928,802

[22] Filed: Nov. 7, 1986

[51] Int. Cl.$^4$ .......................... B32B 3/06; B32B 3/00; B65H 81/00; C09J 7/02
[52] U.S. Cl. .................................. 428/57; 428/195; 428/343; 428/354; 427/208; 156/185; 156/524
[58] Field of Search .................. 427/208; 428/57, 195, 428/343, 354; 156/185, 524

[56] References Cited

U.S. PATENT DOCUMENTS

| | | | |
|---|---|---|---|
| 3,138,476 | 6/1964 | Phipps | 427/208 X |
| 3,648,835 | 3/1972 | Yucel | 427/208 X |
| 4,410,575 | 10/1983 | Obayashi et al. | 428/57 |
| 4,415,400 | 11/1983 | Rammelmeyr . | |
| 4,551,375 | 11/1985 | Sato et al. | 428/57 |
| 4,563,379 | 1/1986 | Krüger | 428/57 X |
| 4,582,737 | 4/1986 | Torgenson et al. | 428/354 X |

Primary Examiner—George F. Lesmes
Assistant Examiner—D. R. Zirker
Attorney, Agent, or Firm—Christensen, O'Connor, Johnson & Kindness

[57] ABSTRACT

A two-sided adhesive tape comprising first and second single-sided adhesive tapes connected to one another by a bridge member. Each single-sided adhesive tape comprises an elongated strip of flexible material having lengthwise extending lateral edges, an adhesive side surfaced with adhesive, and a back side not surfaced with adhesive. The bridge member comprises an elongated strip of flexible material having lengthwise extending lateral edges. The single-sided adhesive tapes are positioned in edge-to-edge relationship to one another, such that their inner lateral edges are adjacent to one another with the adhesive sides of the single-sided adhesive tapes facing in opposite directions. The bridge member extends between the single-sided adhesive tapes. In one embodiment, the bridge member is adhesively joined to the adhesive sides of the single-side adhesive tapes. In a second embodiment, the bridge member includes an adhesive surface, the adhesive surface of one lateral edge of the bridge member is joined to the adhesive surface of the first single-sided adhesive tape, and the adhesive surface of the second lateral edge of the bridge member is joined to the back surface of the second single-sided adhesive tape. Apparatus and method for making such two-sided adhesive tape are also disclosed.

7 Claims, 5 Drawing Sheets

TWO-SIDED ADHESIVE TAPE

FIELD OF THE INVENTION

The present invention relates to adhesive tape and, in particular, to two-sided adhesive tape and to an apparatus and method for making two-sided adhesive tape.

BACKGROUND OF THE INVENTION

Single-sided adhesive tape is a well-known article of commerce, and includes masking tape, duct tape and related products. Such tape is widely used to create masks for painting. For example, when a window frame is to be painted, masking tape may be applied to the window pane immediately adjacent the frame, to prevent paint from being inadvertently applied to the pane.

For some painting operations, such as spray painting, it is frequently necessary to protect or mask an area that is wider than the width of conventional masking tape. When such a requirement exists, it is common to position a sheet of paper, cardboard or the like over the area to be protected, and to position strips of masking tape about the edges of the sheet, such that the masking tape borders the area to be painted and secures the sheet. When this technique is used, proper positioning of the sheet and masking tape strips can be a comparatively time-consuming process, particularly if the area to be protected is large.

Two-sided adhesive tape may be used in masking to eliminate many of the limitations of one-sided adhesive tape. Two-sided adhesive tape is tape that includes adhesive on both of its surfaces. When two-sided adhesive tape is used, the tape is first applied adjacent the areas to be painted using one inwardly facing adhesive surface, and a sheet such as paper is then placed over and adhered to the opposite, outwardly facing adhesive surface. However, until recently, two-sided adhesive tape has not achieved widespread use, principally because it generally cannot be formed into a roll without the use of a release liner between adjacent tape layers.

A recent innovation, described in U.S. Pat. No. 4,582,737, provides a two-sided adhesive tape comprising a pair of conventional strips of one-sided tape that are positioned with their adhesive surfaces facing one another and joined along a portion of their widths. This arrangement produces a two-sided adhesive tape having a comparatively thick center section with no adhesive surfaces, and a pair of edge sections adhesively surfaced on opposite sides from one another. This arrangement provides a two-sided adhesive tape that can be used in rolls without the use of release liners.

SUMMARY OF THE INVENTION

The comparatively thick center section of the tape described in U.S. Pat. No. 4,582,737 is a disadvantage for certain applications. For example, two-sided adhesive tape may be used to hold the rigid planar surfaces of two objects together while the objects are machined, e.g., while a hole is drilled through the objects. For this application, two-sided adhesive tape having nonuniform thickness would not achieve good adhesive contact between the two rigid planar surfaces, due to the relatively thick center section with no adhesive surfaces that would act as a barrier to adequate pressure contact between the edge sections of the tapes and the respective planar surfaces. Although two-sided adhesive tapes having substantially uniform thickness are known, such tapes have suffered from the disadvantages they they require release liners to use in rolls, and are costly to manufacture.

The two-sided adhesive tape of the present invention comprises first and second single-sided adhesive tapes connected to one another by a bridge member. Each single-sided adhesive tape comprises an elongated strip of flexible material having lengthwise extending lateral edges, an adhesive side surfaced with adhesive, and a back side not surfaced with adhesive. The bridge member comprises an elongated strip of flexible material having lengthwise extending lateral edges. The single-sided adhesive tapes are positioned in edge-to-edge relationship to one another, such that an inner lateral edge of the first single-sided adhesive tape is adjacent to an inner lateral edge of the second single-sided adhesive tape, and such that the adhesive sides of the first and second single-sided adhesive tapes face in opposite directions from one another. The bridge member is positioned such that one lateral edge of the bridge member is adhesively joined to the first single-sided adhesive tape, and the opposite lateral edge of the bridge member is adhesively joined to the second single-sided adhesive tape.

In one preferred embodiment, the bridge member is adhesively joined to the adhesive sides of the first and second single-sided adhesive tapes, such that the bridge member extends between the inner lateral edges of the first and second single-sided adhesive tapes. In a second preferred embodiment, the bridge member includes an adhesive side surfaced with adhesive, and a back side not surfaced with adhesive. The adhesive side of one lateral edge of the bridge member is joined to the adhesive side of the first single-sided adhesive tape, and the adhesive side of the opposite lateral edge of the bridge member is adhesively joined to the back side of the second single-sided adhesive tape.

The first and second single-sided adhesive tapes may have different adhesion and/or backing properties from one another, and may also be selected such that the opposite sides of the two-sided adhesive tape are visually distinguishable from one another by a user, e.g., such that the opposite sides have different colors and/or printed patterns.

The present invention also provides an apparatus and method for making the above-described two-sided adhesive tape. The apparatus comprises means for mounting first and second input spools of single-sided adhesive tape, and a third input spool of a bridge member, for rotation about respective input axes. The apparatus further includes tape processing means for pulling first and second strips of single-sided adhesive tape and a third strip of the bridge member from the respective input spools by applying a pulling force to each strip that is sufficient to pull the strip from its respective input spool, and that is substantially uniform across the width of the strips. The tape processing means joins the first, second and third strips to form the two-sided adhesive tape. Means are also provided for taking up the two-sided adhesive tape onto an output device.

In one embodiment, the tape processing means includes an intermediate roller having a contact surface for engaging the strips and pulling the strips from their respective input spools. The intermediate roller is positioned such that the strips can pass from the input spools around a portion of the contact surface onto the output device. The tape processing means further includes means for causing the intermediate roller to rotate. In a second embodiment, the tape processing means comprises first and second intermediate rollers mounted adjacent one another for rotation about respective axes, the spacing between the first and second intermediate rollers at their point of closest approach to one another being not substantially greater than the thickness of either strip. Means are provided for causing the intermediate rollers to rotate in opposite directions. The bridge member extends to the first intermediate roller such that the first and third strips are adhesively joined at a first mating point. The second strip is joined to the bridge member at a second mating point adjacent the point of closest approach. In a related method, the strips are pulled from their respective input spools onto an output roller without using an intermediate roller.

DETAILED DESCRIPTION OF THE INVENTION

Figure 1:
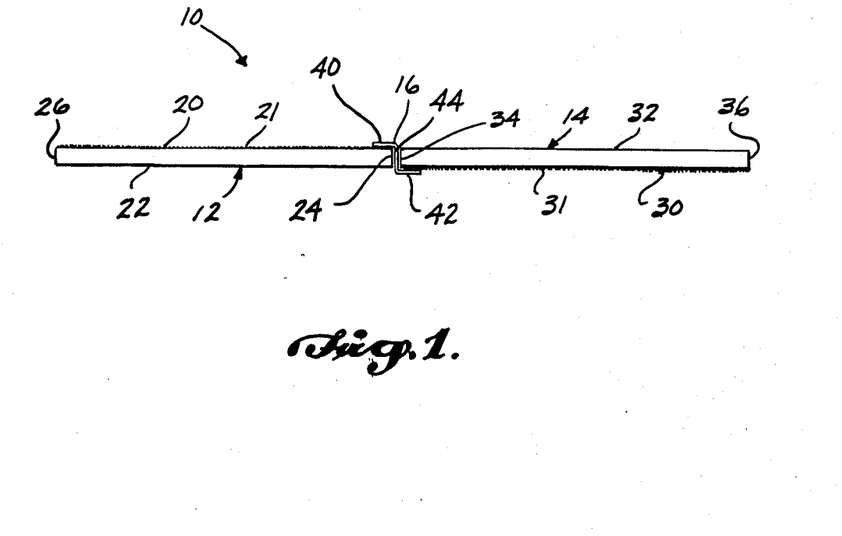
FIG. 1 is a cross-sectional view of the two-sided adhesive tape of the present invention.

FIG. 1 provides a cross-sectional view of one preferred embodiment of the two-sided adhesive tape of the present invention. The two-sided adhesive tape, generally referred to by reference numeral 10, comprises single-sided adhesive tapes 12 and 14, interconnected by bridge member 16. Single-sided adhesive tape 12 comprises front surface 20 that is surfaced with adhesive 21, back surface 22 that is not surfaced with adhesive, inner lateral edge 24, and outer lateral edge 26. Single-sided adhesive tape 14 similarly includes front surface 30 that is surfaced with adhesive 31, back surface 32 that is not surfaced with adhesive, inner lateral edge 34, and outer lateral edge 36. Single-sided adhesive tapes 12 and 14 are positioned such that their inner lateral edges 24 and 34 are adjacent to one another, and such that front surfaces 20 and 30 face in opposite directions, i.e., the outwardly directed normal to surface 20 is rotated 180° with respect to the outwardly directed normal to surface 30. Each single-sided tape 12 and 14 comprises a conventional single-sided adhesive tape, such as masking tape or duct tape.

Bridge member 16 comprises an elongated strip of flexible material that preferably does not include any adhesive surfaces. Bridge member 16 includes lateral edge sections 40 and 42 and center section 44. The bridge member is positioned such that edge section 40 is adhesively joined to front surface 20 of single-sided adhesive tape 12 adjacent to inner lateral edge 24, such that edge section 42 is adhesively joined to front surface 30 of single-sided adhesive tape 14 adjacent to inner lateral edge 34, and such that center section 44 extends between the inner lateral edges 24 and 34. Suitable materials for bridge member 16 include polyethylene film, mylar film, and thin paper. A suitable thickness for bridge member 16 is 1 mil. In general, the bridge member should be as thin as possible while providing the needed mechanical connection between the single-sided adhesive tapes. The bridge member should also be composed of a flexible material that is readily tearable, such that two-sided adhesive tape 10 can be manually torn into required lengths.

Depending upon the application, the bridge material may comprise a porous or nonporous material. For tape to be used for creating masks for painting, a nonporous bridge member will generally be preferred, to prevent paint from passing through it. However, a porous bridge member composed of a fiber mesh, or the like, may provide better adhesion between the bridge material and the adhesive surface of each single-sided adhesive tape, due to the mesh becoming buried in the adhesive layer. The result would be a tape having more uniform thickness across its width, making it especially suitable for many machine shop applications. In one preferred embodiment, the bridge member is fabricated from a fiber mesh having lengthwise fibers that tear easily, and cross fibers that are strong and resistant to stretching. The result would be a tape that tears easily, but that has a firm binding between the two single-sided adhesive tape strips.

When the two-sided adhesive tape of the present invention is used for masking, the tape will be adhered to wall or other underlying surface using one side of the tape, termed as "down" side, and a sheet of masking material will then be placed over the tape such that the masking material adheres to the opposite or "up" side of the tape. In general, the down and up sides of the tape must meet different requirements, i.e., must have different adhesion and/or backing properties. For example, the down side of the tape should have adequate adhesion to a wide variety of subtrates, but should not have excessive adhesion, so that it can be removed without damaging the substrate. It should not leave any adhesive residue when removed and should be resistant to any of a large number of paints and other coatings, i.e., the adhesive used on the down side should not draw a coating material into the mastic. All of these requirements, in general, will increase the cost of single-sided adhesive tape used to form the down side. In contrast, the up side of the tape may be specialized for high adhesion to a particular masking material, such as polyethylene film or paper. In general, this will permit a less expensive tape to be used for the up side. Thus, in many embodiments, it will be preferable that the single-sided adhesive tapes 12 and 14 have different adhesion and/or backing properties. For example, single-sided adhesive tape 12 may include adhesive 21 that has a different tack property as compared to adhesive 31 of single-sided adhesive tape 14.

Where single-sided adhesive tapes having different adhesion properties (e.g., adhesives of different tacks) are used, it is preferred that single-sided adhesive tapes 12 and 14 be visually distinguishable from one another. For example, for a two-sided adhesive tape in which the constituent single-sided adhesive tapes have different tack properties, adhesives 21 and 31 may have different colors from one another so that a user can readily determine which side of the two-sided adhesive tape is the high tack side, and which is the low tack side. Alternatively, back surfaces 22 and 32 of the single-sided adhesive tapes may have different markings from one another so that a user can readily distinguish the two sides from one another. In many instances, front surfaces having different colors from one another can be achieved simply by making the tape backing materials themselves from different colors, and relying on adhesives 21 and 31 to cover such colors on the front sides of the constituent single-sided adhesive tapes.

Figure 2:
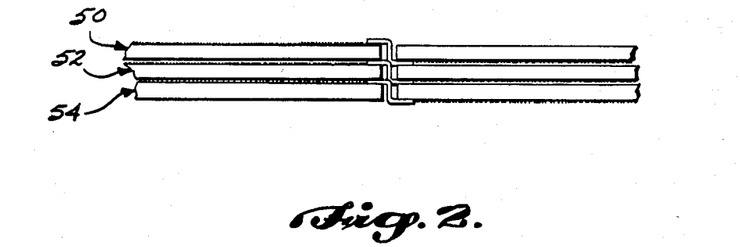
FIG. 2 is a partial cross-sectional view showing the two-sided adhesive tape of the present invention formed into a stack such as on a roll.

FIG. 2 presents a cross section of a stack formed from layers 50, 52 and 54 of the two-sided adhesive tape of the present invention, as, for example, when the two-sided adhesive tape is formed into a roll. FIG. 2 illustrates that the two-sided adhesive tape of the present invention can be stacked without contact between two adhesive surfaces, and that the two-sided adhesive tape can therefore be formed into a roll without the use of release liners, as with the adhesive tape shown in U.S. Pat. No. 4,582,737. However, the two-sided adhesive tape shown in FIG. 1 includes a number of features that distinguish it from the two or double-surfaced adhesive tape shown in U.S. Pat. No. 4,582,737. These different features makes the two-sided adhesive tape of the present invention preferable for some applications. In particular, the two-sided adhesive tape of the present invention is highly suitable for joining two objects when the allowed relative movement between the objects must be minimized, for example, during machining operations. Furthermore, as indicated in FIG. 2, in the preferred embodiment in which bridge member 16 is substantially thinner than either single-sided adhesive tape, the two-sided adhesive tape of the present invention can be stacked upon itself, such as in a roll, with very little gap beween adjacent tape layers. Because of this comparatively tight stacking between adjacent layers, the two-sided adhesive tape of the present invention may be packed onto a roll in a smaller volume, and with a more uniform appearance. The adhesive material of the two-sided tape of the present invention is also less exposed to the environment during storage of the tape on rolls.

Figure 3:
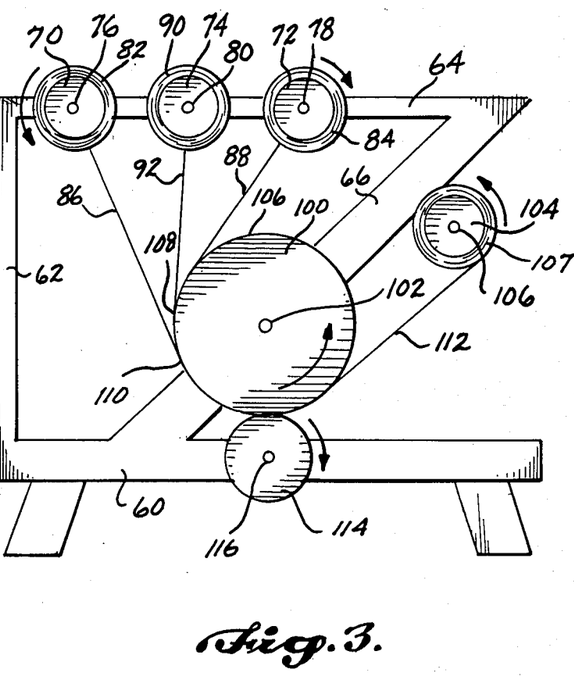
FIG. 3 is a schematic view of a first preferred embodiment of an apparatus for making the two-sided adhesive tape.

FIG. 3 sets forth a schematic diagram of one preferred embodiment of an apparatus for making a two-sided adhesive tape of the present invention. The apparatus comprises a frame having base 60, post 62, horizontal support 64 and angled support 66. Input rollers 70, 72 and 74 are mounted to horizontal support 64 such that the input rollers can rotate about pivot pins 76, 78 and 80, respectively. Mounted on input rollers 70 and 72 are input spools 82 and 84, respectively, of single-sided adhesive tape. Input spool 82 is mounted such that strip 86 of single-sided adhesive tape can be pulled from input spool 70 as the input spool rotates in the counterclockwise direction, as indicated by the arrow adjacent input spool 82 in FIG. 3. Input spool 84 is mounted such that strip 88 of single-sided adhesive tape can be pulled from input spool 84 as the input spool rotates in the clockwise direction, as indicated by the arrow adjacent to input spool 84 in FIG. 3. Mounted on input roller 74 is input spool 90 of a suitable bridging material such as polyethylene film. Input spool 90 is mounted such that strip 92 of bridging material can be pulled from input spool 90 in a downward direction. The direction of rotation of input spool 90 is generally immaterial, since the front and back surfaces of the bridging material have similar or identical properties. Input roller 74 may be mounted on pivot pin 80, such that there is some resistance to rotation of input roller 74, to prevent overrun of input spool 90 during operation of the apparatus.

Intermediate roller 100 is supported below the input rollers from angled support 66. The intermediate roller is mounted on shaft 102 that is connected to a source of rotary motion capable of driving the intermediate roller in the indicated counterclockwise direction. Output roller 104 is also supported from angled support 66, and is mounted on shaft 106 that is connected to a source of rotary motion capable of driving the output roller in the indicated counterclockwise direction. Auxiliary roller 114 is mounted to base member 60 below intermediate roller 100 such that the auxiliary roller is rotatable about pivot pin 116. Auxiliary roller 114 is positioned such that at its point of closest approach to intermediate roller 100, it is spaced from the intermediate roller by a distance slightly less than the thickness of strips 86 or 88.

Referring now to FIGS. 1 and 3, the apparatus of FIG. 3 operates by pulling strips 86, 88 and 92 from input spools 82, 84, and 90, respectively, such that the strips are joined together on surface 106 of intermediate roller 100 to form two-sided adhesive tape 112. Input rollers 70, 74 and 72 are positioned into and out of the plane of the drawing in FIG. 3, such as with spacers, to produce the overlap shown in FIG. 1. Input spools 84 and 90 are positioned such that slightly less than half the width of strip 92 of bridging material 16 overlaps strip 88. Because the adhesive surface of strip 88 faces strip 92, strips 88 and 92 are adhesively joined to one another on surface 106 of the intermediate roller at first mating point 108. Input spool 82 is positioned such that its inner edge (reference numeral 24 in FIG. 1) is adjacent to and slightly displaced from the inner edge (reference numeral 34) of strip 88. Strip 86 is therefore joined to strip 92 at second tape mating point 110 to form two-sided adhesive tape 112. Second tape mating point 110 is spaced around the circumference of the intermediate roller from first mating point 108. This is a preferred feature of the apparatus shown in FIG. 3, inasmuch as it produces a consistent and controllable alignment between strips 86, 88 and 92.

The two-sided adhesive tape continues about a portion of the circumference of the intermediate roller, passes between intermediate roller 100 and auxiliary roller 114, and then extends to output roller 140 upon which the two-sided adhesive tape is taken up to from output spool 107. The function of auxiliary roller 114 is to exert a compression force on the two-sided adhesive tape to ensure firm adhesion between the bridge member and the single-sided adhesive tapes. The auxiliary roller may also be positioned such that it compresses the inner lateral edges of the strips, such that the thickness of the center section of the two-sided adhesive tape is comparable to the thickness of each strip, resulting in a two-sided adhesive tape that has a more uniform thickness across its width.

In a preferred embodiment, a single drive mechanism may be used for both the intermediate roller and the output roller. In such an embodiment, output roller 104 is preferably driven via a clutch or similar mechanism such that the output roller can keep up with the rate of tape delivery from the intermediate roller regardless of the amount of two-sided adhesive tape on output spool 107. Auxiliary roller 114 is driven in the indicated clockwise direction by reason of its contact with intermediate roller 100 and/or two-sided adhesive tape 112.

Figure 4:
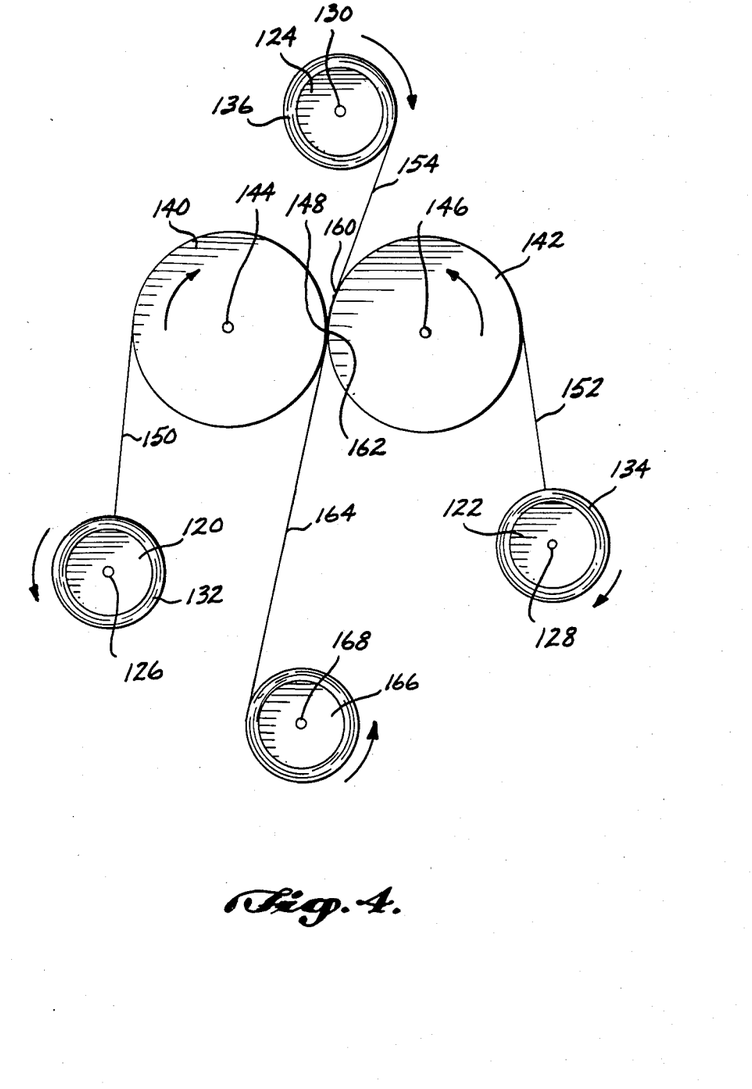
FIG. 4 is a schematic view of a second preferred embodiment of an apparatus for making the two-sided adhesive tape.

FIG. 4 illustrates in schematic form a second preferred embodiment of an apparatus for making the two-sided adhesive tape of the present invention. The apparatus of FIG. 4 includes input rollers 120, 122 and 124 that are mounted for rotation about pivot pins 126, 128 and 130, respectively. Input rollers 120 and 122 mount input spools 132 and 134, respectively, of single-sided adhesive tape, while input roller 124 mounts input spool 136 of bridging material. The apparatus of FIG. 4 also includes a pair of intermediate rollers 140 and 142, respectively, that are mounted for rotation about axes 144 and 146, respectively. The intermediate rollers are positioned such that at their point of closest contact 148, the distance between the intermediate rollers is approximately equal to or slightly less than the thickness of the single-sided adhesive tape comprising input spools 132 and 134.

The intermediate rollers are connected to suitable drive means for rotating the intermediate rollers in opposite directions at the same rotation rate, such that intermediate roller 140 rotates in the indicated clockwise direction, and intermediate roller 142 rotates in the indicated counterclockwise direction. Strip 150 of single-sided adhesive tape is pulled from input spool 132 and passes around the intermediate roller 140 with its adhesively surfaced side facing away from the intermediate roller. Similarly, strip 152 of single-sided adhesive tape is pulled from input spool 134 and passes around intermediate roller 142 with its adhesively surface side facing away from the intermediate roller. Strip 154 of bridging material is pulled from spool 136 towards the gap between the intermediate rollers at their point of closest approach 148. Strips 150, 152 and 154 are aligned across the widths of the strips as in the embodiment of FIG. 3. As a result, strips 152 and 154 are joined at first mating point 160, and strip 150 is joined to strip 154 at second mating point 162, thereby producing two-sided adhesive tape 146 that is taken up on output roller 166 that is driven in the indicated counterclockwise direction about shaft 168. As with the embodiment of FIG. 3, first and second mating points 160 and 162 are preferably displaced from one another, to facilitate proper alignment of the strips in the two-sided adhesive tape. In general, second mating point 162 will be coincident with point of closest contact 148.

Figure 5:
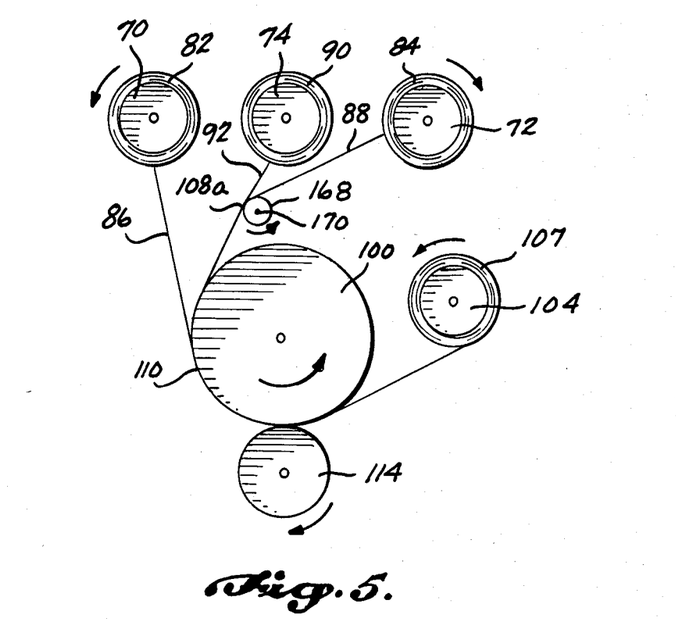
FIG. 5 is a schematic view of a third preferred embodiment of an apparatus for making the two-sided adhesive tape.

FIG. 5 is a schematic view showing a variation of the embodiment of FIG. 3. The same reference numerals are used for identical parts as between FIGS. 3 and 5. The embodiment shown in FIG. 5 includes mating roller 168 mounted below input roller 74 for rotation about pivot pin 170. The mating roller is positioned such that first mating point 108a occurs on the surface of the mating roller rather than on intermediate roller 100. The advantage of this arrangement is that there is a shorter run of strip 92 between input spool 90 and the first mating point.

Figure 6:
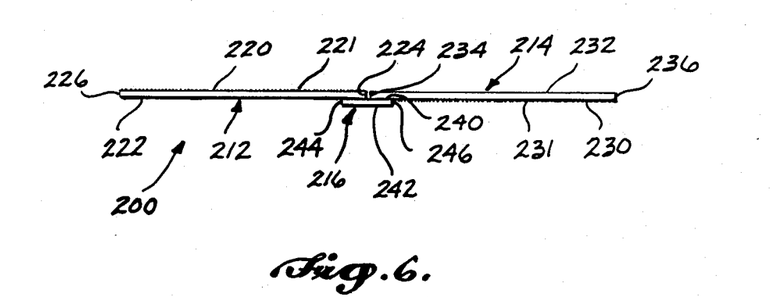
FIG. 6 is a cross-sectional view of a second embodiment of the two-sided adhesive tape of the present invention.

A second preferred embodiment of the two-sided adhesive tape of the present invention is illustrated in FIG. 6. Two-sided adhesive tape 200 comprises single-sided adhesive tapes 212 and 214, interconnected by bridge member 216. Single-sided adhesive tape 212 comprises front surface 220 that is surfaced with adhesive 221, back surface 222 that is not surfaced with adhesive, inner lateral edge 224, and outer lateral edge 226. Single-sided adhesive tape 214 similarly includes front surface 230 that is surfaced with adhesive 231, back surface 232 that is not surfaced with adhesive, inner lateral edge 234, and outer lateral edge 236. Single-sided adhesive tapes 212 and 214 are positioned such that their inner lateral edges 224 and 234 are adjacent to one another, and preferably in contact with one another, and such that front surfaces 220 and 230 face in opposite directions. Each single-sided tape 212 and 214 comprises a conventional single-sided adhesive tape, such as masking tape or duct tape.

Bridge member 216 comprises an elongated strip of flexible material that includes front surface 240 that is surfaced with adhesive, back surface 242 that is not surfaced with adhesive, and edge sections 244 and 246. Bridge member 216 is positioned such that edge section 244 is adhesively joined to back surface 222 of single-sided adhesive tape 212, and such that edge section 246 is adhesively joined to front surface 230 of single-sided adhesive tape 214. The adhesive bond between bridge member 216 and single-sided adhesive tape 212 is formed by the adhesive on the front surface of the bridge member. The adhesive bond between bridge member 216 and single-sided adhesive tape 214 is formed by the adhesive on the front surface of the bridge member and the adhesive on the front surface of single-sided adhesive tape 214.

The two-sided adhesive tape shown in FIG. 6 can be made by any of the embodiments shown in FIGS. 3-5 simply by switching the input spool containing the bridge member with one of the input spools containing single-sided adhesive tape. For example, in the embodiment of FIG. 3, input spool 84 would comprise the bridge member, positioned such that the front surface of strip 88 faced to the left in FIG. 3. The front surface of strip 92 would also face to the left, such that strips 88 and 92 were joined at mating point 108 to form a structure comprising single-sided adhesive tape 212 and bridge member 216 of FIG. 6. Input spool 82 would be arranged such that the front surface of strip 86 faced to the right, such that strip 86 was joined to the bridge member at second mating point 110 to form the two-sided adhesive tape of FIG. 6.

In the embodiment of FIG. 4, input spool 134 could comprise the bridge material, positioned such that the front surface of strip 152 faced to the right and the point where it leaves the input spool. Input spools 132 and 136 would comprise the first and second single-sided adhesive tapes, positioned such that the front surface of strip 150 faced to the left and the point where it leaves the input spool, and such that the front surface side of strip 154 also faced to the left. Thus, strips 152 and 154 would be joined at first mating point 160 to form a structure corresponding to single-sided adhesive tape 212 and bridge member 216 shown in FIG. 6, and strip 150 would be joined to this combination at second mating point 162. In this arrangement, input roller 124 would preferably be moved somewhat to the right of the position shown in FIG. 4 to provide a longer arc of contact between strip 154 and intermediate roller 142. Use of the embodiment of FIG. 5 to manufacture the double-sided adhesive tape of FIG. 6 is essentially identical to that of FIG. 3, except that input roller 74 does not need to be repositioned.

Figure 7:
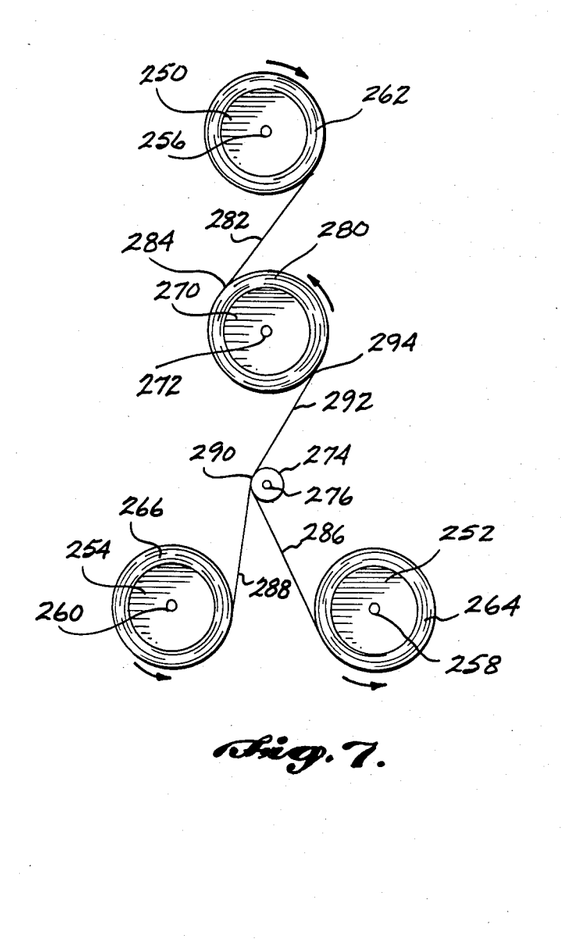
FIG. 7 is a schematic view showing an additional embodiment of a method for making the two-sided adhesive tape.

An additional method of making the two-sided adhesive tape of the present invention is illustrated in schematic form in FIG. 7. The apparatus shown in FIG. 7 includes input rollers 250, 252 and 254 mounted for rotation about pivot pins 256, 258 and 260, respectively. Input spools 262 and 264 of single-sided adhesive tape are mounted on input rollers 250 and 252, respectively. Input spool 266 of bridging material is mounted on input roller 254. The apparatus of FIG. 7 also includes output roller 270 mounted on shaft 272 that in, in turn, mounted to a source of rotary motion, and guide roller 274 mounted on pivot pin 276.

The arrangement of FIG. 7 forms output spool 280 of two-sided adhesive tape of the tape shown in FIG. 1 on output roller 270, without the use of intermediate rollers. Strip 282 of single-sided adhesive tape is unrolled from input spool 262 and joins output spool 280 at point 284 with the adhesive surface of strip 282 facing outward. Strip 286 of single-sided adhesive tape is unwound from input spool 264 and passes around a portion of the circumference of guide roller 274. Strip 288 of bridging material is unwound from input spool 266 and is joined to strip 286 at mating point 290 on guide roller 274. Composite strip 292 of single-sided adhesive tape and bridge material then extends to output spool 280 and is joined to strip 282 at second mating point 294. Rollers 250, 252, 254 and 270 are positioned, in the direction normal to the plane of the drawing of FIG. 7, to produce the appropriate overlap and alignment between strips 282, 286 and 288 and output roller 270. The arrangement shown in FIG. 7 is particularly suitable for making two-sided adhesive tape, wherein the bridge member is substantially thinner than either single-sided adhesive tape, such that the center section of the two-sided adhesive tape is not substantially thicker than the edge sections thereof. It will be appreciated that the technique shown in FIG. 7 could readily be adapted for making the two-sided adhesive tape shown in FIG. 6 by switching the positions of input spools 264 and 266.

While the preferred embodiments of the invention have been illustrated and described, variations will be apparent to those skilled in the art. The invention is therefore not limited to the specific embodiments and described, and the true scope of the invention is to be determined by reference to the following claims.

The embodiments of the invention in which an exclusive property or privilege is claimed are defined as follows:

1. A two-sided adhesive tape that does not require a release sheet between overlying layers thereof, comprising first and second single-sided adhesive tapes connected to one another by a bridge member;
    each single-sided adhesive tape comprising an elongated strip of flexible material having lengthwise extending lateral edges, an adhesive side surfaced with adhesive, and a back side not surfaced with adhesive;
    the bridge member comprising an elongated strip of flexible material having lengthwise extending lateral edges;
    the single-sided adhesive tapes being positioned in edge-to-edge relationship to one another such that an inner lateral edge of the first single-sided adhesive tape is adjacent to an inner lateral edge of the second single-sided adhesive tape and such that the adhesive sides of the first and second single-sided adhesive tapes face in opposite direction from one another;
    the bridge member being positioned such that one lateral edge of the bridge member is adhesively joined to the first single-sided adhesive tape by the adhesive surface of said first single-sided adhesive tape, and such that the opposite lateral edge of the bridge member is adhesively joined to the second single-sided adhesive tape by the adhesive surface of said second single-sided adhesive tape.

2. The two-sided adhesive tape of claim 1, wherein the bridge member is adhesively joined to the adhesive side of each single-sided adhesive tape, such that the bridge member extends between the inner lateral edges of the single-sided adhesive tapes.

3. The two-sided adhesive tape of claim 1, wherein the bridge member includes an adhesive side surfaced with adhesive and a back side not surfaced with adhesive, the bridge member being positioned such that the adhesive side of one lateral edge of the bridge member is adhesively joined to the adhesive side of one of the single-sided adhesive tapes, and such that the adhesive side of the opposite lateral edge of the bridge member is adhesively joined to the back side of the other single-sided adhesive tape.

4. The two-sided adhesive tape of claims 1, 2 or 3, wherein the thickness of the bridge member is less than the thickness of either single-sided adhesive tape.

5. The two-sided adhesive tape of claims 1, 2 or 3, wherein for each single-sided adhesive tape, the portion of the surface to which the bridge member is joined is less than half of the total area of such surface.

6. The two-sided adhesive tape of claims 1, 2 or 3, wherein the first and second single-sided adhesive tapes have different adhesion properties from one another.

7. The two-sided adhesive tape of claim 6, wherein the single-sided adhesive tapes include markings selected such that one surface of the two-sided adhesive tape is visually distinguishable from the opposite surface of the two-sided adhesive tape.

* * * * *